United States Patent Office 3,408,202
Patented Oct. 29, 1968

3,408,202
PROCESS FOR PREPARING A QUICK-COOKING RICE
George W. Serbia and Irving Benett, New City, N.Y., assignors to General Foods Corporation, White Plains, N.Y., a corporation of Delaware
No Drawing. Continuation of application Ser. No. 507,667, Nov. 15, 1965. This application Jan. 17, 1967, Ser. No. 609,964
17 Claims. (Cl. 99—80)

ABSTRACT OF THE DISCLOSURE

Preparation of a quick-cooking rice by soaking parboiled rice in water below its gelatinization temperature followed by employing at least two alternating steaming and cold water immersions to increase the moisture content to at least 60% by weight and thereafter dehydrating said rice to a stable moisture content.

---

This application is a continuation of application Ser. No. 507,667 filed November 15, 1965 which in turn is a continuation-in-part of application Ser. No. 304,216 filed August 23, 1963, both now abandoned.

This invention relates to a process for preparing a quick-cooking rice product having the eating quality of parboiled rice prepared by traditional household recipes.

Parboiled rice is preferred over white rice by many consumers for its texture, appearance, flavor, aroma, and recipe tolerance. However, due to the pretreatment of the rice paddy which produces parboiled rice, the grain is rendered longer-cooking than milled white rice. Most parboiled rice of commerce calls for immersion-cooking of at least 20 minutes in boiling water to prepare the parboiled rice to the desired edibility. During the process of converting rough rice to parboiled rice, the paddy is soaked, steamed, dried, and then milled. It appears that the heat treatment involved in this processing reduces product rehydratability and renders it hard and longer to cook.

It is an object of the present invention to provide a rice product having the eating quality of cooked parboiled rice prepared by traditional household recipes and which is quick-cooking, that is, capable of conversion to an edible form either by adding the product to boiling water, removing from heat and letting stand for a period of about 7 to 11 minutes, or by simmering the product in water for a period of about 5 to 8 minutes. It is a further object of the present invention to provide such a quick-cooking parboiled-textured rice product by a process which involves minimal loss of solids.

This invention employs a process by which parboiled rice is cooked, softened and swelled to a uniform palatable texture by gradual increments of hydration and cooking and then is dried such that, upon rehydration, the dried product will assume the desired appearance and table qualities of parboiled rice, yet rehydrates in a substantially shorter time than parboiled rice and is easier to prepare. Thus, the physical appearance of parboiled rice considered desirable by many, may be retained while its time for rehydration, deemed objectionable by many, may be reduced.

The process involves soaking parboiled rice in water below its gelatinization temperature followed by alternating steaming and cold water immersions, employing two or more such cycles to achieve the desired degree of cook for the product. The process is unique in that rice is brought to a fully cooked condition of exceptional uniformity from grain to grain and from the surface of the grain to its interior without immersion in water above the gelatinization temperature of rice starch. By such avoidance of contact of rice surfaces with excess water heated above the gelatinization point of starch, in addition to the aforementioned product benefits which accrue, a process is provided in which solubilization and rupture of the rice grain surface starch is minimized and process yields are maximized.

During each immersion and agitation step, a small quantity of water is absorbed and adsorbed by the surface layers of the rice grain. The grain is drained of excess moisture and enveloped in an atmosphere of saturated steam wherein, by condensation, another small quantity of water is deposited on the grain surfaces. The rice heats to the temperature of the enveloping steam atmosphere and deposition of moisture by condensation ceases. During such steaming the water absorbed and adsorbed in the grain surface layers diffuses to the center of the grain and distributes itself uniformly throughout the grain. Simultaneously, the steam treatment gelatinizes the rice at this imbibed moisture level. As the steamed rice leaves the steaming chamber after each such steaming step, the rice is dry to the touch and will readily absorb another incremental quantity of water. Prolonged immersions in water above the gelatinization temperature at any point intermediate the initial and final steaming steps and prolonged steamings beyond the point at which cooking at each imbibed moisture level is completed must be avoided; otherwise, the rice will have overcooked surfaces and uneven texture throughout each grain, which thereby degrades product appearance and increases solids losses.

After the condition of a uniform, fully cooked, swollen, hydrated rice grain is achieved, specific drying techniques are practiced in order that the aforesaid desired properties of parboiled rice will be manifested in the later rehydrated product. The swollen, cooked rice is dried under conditions whereby excessive stresses in the rice grain are avoided during dehydration and the starch cell structure remains essentially intact, without substantial cleavage. While puffing or creation of internal voids to a moderate degree may thus take place during dehydration, such conditions do not appear particularly disadvantageous but instead appear to permit shorter terms for rehydration of the product whether using standing water or simmering water recipes. The product is dried at least to an intermediate moisture level under conditions where moderate shrinkage of the grain may occur without a loss of grain structure.

In accordance with the present invention, quick-cooking rice having the culinary properties of parboiled rice is prepared by partially hydrating parboiled rice in water at or below about 160° F. for a period of time sufficient to increase the rice grain moisture content to 15–50%; draining the rice of excess free water and enveloping the hydrated rice with saturated steam for a period of time sufficient to elevate the rice to a temperature of 180°–212° F.; maintaining the rice in this atmosphere and at this temperature for a period sufficient to uniformly soften, swell, and partially cook and hydrate the rice to a level at which the starch therein is completely gelatinized at the imbibed moisture content; uniformly terminating the rice-cooking process by immersion and agitation in water at a temperature below 160° F. to firm the rice and cause it to imbibe additional moisture and separate the grains from one another and thus stop the gelatinization at the desired level; draining the rice of excess free water and re-enveloping the quenched, partially cooked grains in an atmosphere of saturated steam to re-elevate the temperature thereof to 180°–212° F.; maintaining the reenveloped rice grains in this steam atmosphere for a period sufficient to further cook, swell, soften, and hydrate the grain; reimmersing and reagitating the rice in an excess of water at a temperature below 160° F. to rearrest cooking, and refirm the rice grain and cause it to imbibe further quantities of water; and preferably repeating each of said steam reenvelopment and water reimmersion steps at least once in said order until the grain has been hydrated to a moisture content of at least about 60%, and preferably 65–75%, at which point it will be substantially cooked; dehydrating it under drying rate conditions and at temperatures whereby the rice is reduced to a moisture content of about 7–14% and the starch cell structure remains essentially intact, without substantial cleavage, although puffing or creation of internal voids may occur to a moderate degree.

The invention will now be further described by reference to the following examples:

Example I

Two thousand pounds/hour of parboiled Blue Bonnet rice are soaked in an excess of water at 160° F. for 14 minutes in a reel type water blancher. During the soaking step, the moisture content of the parboiled rice is increased from 8.9% to 46.8%. The rice is then water flumed and spread to a bed depth of approximately 1½ inches onto the belt of an atmospheric steam blancher where it is drained of water prior to entering the steam chamber. Steam issuing from nozzles forms a spray pattern beneath the belt to provide a substantially continuous or uniform supply of steam for admission to the rice. Optionally, to reduce residence time, superposed steam may also be introduced above the bed of rice to provide a similar pattern for admitting high velocity steam to the bed of rice entering the steamer. The rice is thereby caused to undergo an envelopment with steam. The steam admitted to the bed is of sufficient velocity that it will heat all of the internal regions of the rice bed whereby the temperature of the bed is elevated to 212° F. as rapidly as possible, which will usually occur in approximately 5 minutes. Thereafter, the steam is continuously admitted to the bed to maintain the temperature of all rice grains therein at 212° F. for a period ranging from 13 to 25 minutes. In this example, the rice is subjected to 1,100 pounds/hour of atmospheric steam uniformly sprayed in the chambers into the rice from below the bed for a period of 25 minutes. As a result of this steam treatment, the rice will undergo a partial cooking witnessed by a slight swelling and softening of the individual grains. The grains will remain discrete with respect to one another and will be superficially dry to the touch. Steaming will not be continued for such period of time as will give surface rupture of starch. In this connection, it is important to control bed load, residence time, and steam rate during partial cooking in order to avoid significant surface rupture of starch cells. At bed loadings above five inches the burden on the lower regions of the rice bed will be such that the rice in contact with the belt will be deformed, broken, or otherwise lose grain integrity. Likewise, at prolonged residence times beyond 25 minutes undue softening which will invite such breakage and/or deformation of grain integrity will occur. The velocity of the steam injected into the bed should not be high enough to cause rupture of the grain. The steam admitted to the bed should be of good quality and not superheated, nor should it contain excessive entrained water to cause localized overcooking of the outer regions of the bed; hence, the steam admitted should be saturated and of high quality.

The partially cooked rice after leaving the steam chamber is then washed from the belt with cold water (less than 90° F.), quenched and pumped onto the belt of a second steam blancher identical to that described hereinbefore. The retention time in the pumping operation is about 15–18 seconds. During this time of immersion and agitation, the rice becomes dispersed discretely, and cooking is terminated. The rice grains will be toughened, cooking will be arrested, and additional moisture will be added to the grains through adsorption and absorption.

The water is then drained from the rice, whose moisture content is now approximately 54.7%. The rice is then subjected to the same amount and type of steaming as in the first step, except for a shorter duration of 20 minutes. After steaming, the rice is further cooked and swollen. After leaving the second steam chamber the rice is again washed from the belt and pumped onto the belt of a third steam blancher identical to the first two. This quenching and pumping operation is the same as the first, that is, the rice is immersed, agitated, cooled and tempered, using cold water (less than 90° F.) and a retention time of 15–18 seconds. After draining, the moisture content of the rice is 63.5%. For a third time the rice is steamed identical to the first two steamings except for a shorter duration of 15 minutes. A third identical washing, quenching and pumping conveyed the rice to a drain belt where excess water was removed prior to rehydration. At this point the rice has a moisture content of 68.9%. The rice is thus in a palatable, uniformly gelatinized condition and is observed to have swollen 3 to 4 times its original volume as unsoaked parboiled rice. During this steam cooking, the soaked parboiled rice has undergone an increase in moisture content from approximately 45% to approximately 70% as substantially cooked rice. The unsoaked parboiled rice will have increased in bulk volume during the cooking cycles from about 175 cc./142 grams to about 550–600 cc./142 grams.

The cooked rice is of an edible consistency and is uniquely characterized by the discrete individual character of each grain as it bridges in a bed thereof; the grain has a uniform, slightly rubbery, slightly soft, chewy texture, but with no evidence of any grainy, gritty center. Further, the cooked rice has a subtle nut-like, slightly cereal-type flavor.

The soaked, cooked rice having been drained of free water is then fed to the dryer apparatus hereinafter described.

Rice is fed into the first of three sections of a through-circulation continuous belt dryer at a bed depth of ¾ inch to one inch. Air admitted to the first section of the dryer is at a temperature of 290°–320° F., depending upon dryer load, and is circulated through the bed from the bottom upward, a portion of the air being exhausted and a portion being recirculated. Air is circulated through the bed at a constant superficial velocity of 150–200 feet per minute. Air is recirculated to allow an exhaust air humidity from the drying chamber of 0.1 pound of water per pound of dry air, and broadly between .05 to 0.2 pound of water per pound of dry air. Under these conditions, drying will occur; water will evaporate from the surface of the swollen, hydrated grain at a rate equal to the rate at which the water migrates to the surface of the grain from its interior with the result that minimal to moderate shrinkage of the rice is observed. During this drying stage, moisture content of the rice is reduced from about 70% to approximately 45%. Essentially, the entire bed of rice will have been uniformly dried to the aforestated moisture level. Although slightly shrunk, the rice is however structurally stabilized so that it can be further dehydrated under any desired dehydration process such as fluidized bed drying, vibrating conveyor dryers, rotary dryers, and any other means which will cause the rice to dry to a stable moisture content.

Using the present continuous drying apparatus, the rice is fed continuously on the belt to the second dryer section wherein it is contacted with a forced draft of hot drying air at a typical temperature of 280° F. (ranging from 270° to 290° F.) directed downwardly onto the bed of product on the belt, whereafter it is exhausted. The air has a moisture content of 0.075 lb. of water per lb. of dry air (measured at the exhaust of chamber) and ranging typically from 0.05 lb. to 0.15 lb. of water per lb. of dry air. The air is circulated through the bed at the same superficial velocity as that of the first dryer section. As a result of passage through this drying chamber, the rice will be reduced to a moisture content of approximately 20%. The rice exiting from the second dryer section will be relatively dry to the touch, and have a tough, rubbery feel to the hand, will be smooth in appearance, and will have puffed moderately from its original swollen hydrated condition prior to admission to the dryer. The drying that occurs in this second dryer section may be characterized as falling rate drying, i.e., the water appears to evaporate from the surface at a rate faster than steam can diffuse from the interior.

From the second dryer section, the rice is introduced to the third dryer section wherein it is contacted with air circulating upwardly through the bed at the same superficial air velocity as that of the first and second dryer sections. The temperature of the air will be typically 240° F. and may range between 240° and 270° F., the humidity of the drying air circulated through the bed being 0.03 lb. of water per lb. of air (measured at the exhaust of chamber) and may range between 0.01 and 0.10 lb. of water per lb. of drying air. The rice will be dehydrated to a terminal moisture of 7–13%. In this example, the rice is dehydrated to a stable moisture content of 12.6% and the total drying time is 13 minutes. The dried rice will have shrunk further to a point where it has a bulk volume of about 340 cc./142 grams.

The rice issuing from the third section of the dryer will have a slightly vitreous appearance. The surface of the rice will be smooth with a minimum of surface fissuring. The rice grain will be translucent and will have substantially the same color of the starting material, i.e., the parboiled rice. The rice will be free of split ends or fishtails and show slight evidence of puffing, with a minimal number of hollow centers. The shape of the rice has the same general configuration as the parboiled rice from which it is processed.

After drying, the rice will be introduced to suitable finger-breaking apparatus to separate any grains that may have adhered to each other and will be ready for packaging.

Example II

The procedure of Example I is generally followed employing slightly varied processing conditions as expressly indicated herein.

Parboiled Arkansas Blue Bonnet rice is soaked in water at 160° F. for 10–15 minutes or until a moisture content of 40% is achieved. This rice is then drained of free water and introduced to a steamer as in Example I. Steam is continuously admitted for a period ranging from 18 to 25 minutes to envelop the rice, maintained in a bed, and to maintain the temperature of all rice grains at 212° F. As a result of this steam treatment the rice will pick up approximately 5% moisture.

The partially cooked rice is then immersed in water at a temperature of 60° F. and agitated sufficiently to cause the rice charged thereto to be dispersed discretely and be cooled to below 160° F. The rice is maintained in this body of water for a period of 15–18 seconds. As a result, the rice grains will be toughened, cooking will be arrested, and approximately 5% moisture will be added to the grains through adsorption and absorption.

The 50% moisture rice is then drained of free water and retreated with saturated steam as in the first steamer and for the same period of time. After the steaming, the rice is further soaked and swollen, picks up an additional 5% moisture, and is introduced once again to a quenching bath wherein the rice is agitated and cooled, using 60° F. water, to below 160° F. in a period of 15–18 seconds. This tempered rice picks up an additional 5% moisture and is then drained and admitted to a third steamer of substantially the same design as the first two steamers and operated under substantially the same conditions. The rice is contained in that steamer for a comparable period of 18–25 minutes whereby it is substantially cooked to an edible consistency. During the steam cooking-immersing or quenching steps, the substantially cooked rice has undergone an increase in moisture content from 40% (the moisture content of the parboiled rice following the initial immersing or soaking step) to 65%. The bulk volume of the rice at this point is about 425 cc./142 grams.

The steam cooked rice is finally immersed in 60° F. water wherein it undergoes a further increase in moisture content from 65% to about 70%, during which quenching the rice is uniformly agitated so as to assure individual, discrete firm grains.

The soaked, cooked rice is then drained of free water and fed to a three-section through circulation continuous belt dryer as in Example I. Air is admitted to the first section of the dryer at a temperature of 220°–250° F., to the second section at a temperature of 220°–240° F., typically 225° F., and to the third section at a temperature of 180°–230° F., typically 220° F. The velocity and humidity of the air so admitted are controlled and recirculation is employed as in Example I. Under the drying conditions in the first section, essentially constant rate drying will occur and the rice will shrink slightly and will be thereby structurally stabilized. The drying that occurs in the second and third sections may be characterized as falling rate drying. The rice is thus rehydrated to a terminal moisture content of 10–13% and is noted to show no evidence of puffing and to have a bulk volume of about 285 cc./142 grams. Other properties and characteristics of the rice are similar to those of the rice processed as in Example I.

After drying, the rice is introduced to suitable finger-breaking apparatus and is then packaged.

The rice can be prepared for eating by many recipes. The rice can be added to boiling water, whereupon it is removed from heat and allowed to stand for 10 minutes, preferably in a covered pot. Thus, a typical procedure following this recipe for rehydrating the product to a palatable cooked rice having the desirable eating qualities of parboiled rice is as follows: Bring 360 cc. of water to a boil, add 142 grams of rice, stir, cover, remove from heat and let stand 10 minutes. Alternatively, the rice can be immersed in gently boiling water and allowed to simmer for 7 minutes in an open or covered pot.

The cooked rice product prepared by the consumer after rehydration is slightly soft, rubbery, chewy, uniform and moist; the texture is that of parboiled rice and is deemed by many to be preferable to parboiled rice from the standpoint of its freedom from stickiness. The cooked rice has a slightly sweet subtle cereal aroma with none of the musty, earthy notes of commercial parboiled rice. The cooked rice product has superior appearance and eating qualities and each kernel is uniformly cooked thoughout with no starchy taste or texture. Unique from all other parboiled rice products, the rice product of this invention requires no cooking or extended periods of simmering to attain complete rehydration. Indeed, the rice will have a better over-all eating quality from the standpoint of texture, flavor, and aroma when prepared in accordance with either of the above or other recipes than the starting parboiled rice material introduced to the process would have when prepared by boiling by immersion for 25 minutes.

Thus, in accordance with its more specific aspects, the invention will be seen to involve hydrating and cooking parboiled rice by a plurality of steam-cooking operations, each interrupted by an immersion in water at a temperature less than about 160° F. The immersion water temperature may range from about 50° to about 160° F. The invention involves hydrating and cooking the rice by repeating by steaming and soaking under conditions wherein the rice starch undergoes a degree of heat treatment in the presence of steam noncomitant with the ability of the moisture present to cook the rice, but the rice is not overtreated and caused to undergo rupture of starch cells. In this connection, the brevity of immersion following each steaming is a critical factor. Brief immersion or quenching of the partially steam-cooked rice serves not only to increase the rice moisture to a limited extent of less than 10% in any given immersion, but also to toughen the rice so that in the steam-cooking that immediately follows such quenching the rice will not undergo a significant loss in solids. It is not intended in any steam treatment subsequent to such immersion, to prolong that treatment for a period of time greater than that which will involve increasing the moisture content of the rice by 7.5% and, typically, in the neighborhood of 5% incident to steaming.

Such repetitive steaming and quenching preferably follows an initial soaking or immersing of the rice in water at a temperature below about 160° F., and ranging from about 50° F. to about 160° F., and is repeated for a sufficient number of cycles to cause the rice to be hydrated to at least about 60% moisture, but not greater than 75%, and preferably in the neighborhood of between about 68-72%.

It will be noted the rice cooking operation of the present invention is not carried out in an excess of water, but rather is achieved by periodic repeated hydration of the rice preceding and following a plurality of curtailed steam-cooking steps. Each steam-cooking operation not only involves a hydration of the rice to a moderate extent, but also conditions the rice so that it is able to subsequently absorb a limited quantity of water through immersion therein. Collaterally, immersion or quenching is controlled so that the grain integrity is substantially retained and only a limited additional amount of water is introduced to the rice grain; likewise, the steaming process will be only of sufficient duration to cause the rice starch to be cooked to the extent called for in the presence of water added through prior quenching and taken up by the rice grain incident to steam-cooking.

The steaming operation is caused to proceed under conditions whereby a minimum of loss in rice solids is experienced through the cooking and handling of the rice necessary to achieve a hydrated condition of above 60% moisture.

It appears that by parboiling the raw rice, it is sufficiently toughened to withstand the repeated reversals in grain temperature experienced incident to steaming and quenching. Thus, the rice can be elevated through two or more steaming operations to a temperature of 180°–212° F., and can be maintained at that temperature during the steam-cooking operation without loss of grain solids or integrity. On the other hand, when the parboiled rice is subsequently quenched to temperatures well below 160° F., for example, about 90° F., the initial toughening of the parboiled rice starch cells augments the toughening produced incident to such quenching, whereby steaming can be relied upon exclusively to achieve a cooked rice texture. Advantageously, such brief quenching also toughens the rice so that it will retain a smooth, uniform grain appearance throughout the rigors imposed during repeated steaming.

The steam-cooked rice is introduced to a drying zone wherein it is carried down in moisture content from a level of 65-70% to a level less than 50% and in the order of 35-45% under controlled constant-rate drying conditions whereby the rice grain assumes a structural stability which will dictate its ultimate bulk density. Product moisture, in evaporating from the surface of the rice at a rate slightly less than that at which steam migrates from the rice interior to the surface, gives rise to slight puffing of the individual grain stresses, and rather gradually reduces the bulk density of the grain. The temperature of the drying air admitted to the drying zone during this initial dehydration phase will be not greater than 320° F. since at temperature thereabove it has been observed that excessive puffing occurs incident to drying, thereby giving rise to deterioration in grain's structural integrity. The humidity and the temperature of the inlet drying air are maintained below that point at which particle temperature exceeds the gelatinization temperature of the rice starch; i.e., above 160° F. On the other hand, the rate of drying during this initial dehydration should be sufficiently high to avoid excessive shrinkage of the rice, thereby avoiding a very densified and tough grain which is less quick-cooling. In general, the drying rate should be controlled by controlling the wet and dry bulb temperatures of the inlet drying air and those of the exhaust air from the drying zone, as well as the bed loading and velocity of inlet drying air, such that the product undergoes a reduction as it is dehydrated to about 50%% moisture and to not greater than 40% and preferably not greater than 30% of its bulk volume at 65-70% moisture. The preferred dry bulb temperature range of the inlet drying air during initial dehydration will typically range between about 220° F. and 320° F. although lower inlet temperatures may be practiced, provided air of sufficient high velocity is circulated through the drying zone.

After such initial dehydration, the rice is then further dehydrated usually at lower circulating hot air temperatures and lower humidity. As a result, during this dehydration the rice will be dried to a moisture level in the neighborhood of 7-14% and will undergo further shrinkage to a uniform, vitreous, structure resembling the character of the parboiled rice originally introduced to the process. In carrying out the latter stages of dehydration, particularly as the moisture content is reduced below 50%, the temperature of the circulating drying air will be between about 180° and 290° F. and dehydration will be terminated as a terminal moisture of 7-14% is reached in order to avoid creation of toasted bran or cereal-like notes at a significant level and an undesirable tan color, although the presence of some such cereal notes in a moderate degree is desired.

This process is thus essentially characterized by a plurality of steam cooking steps applied to parboiled rice, each step after the initial steaming step being preceded by immersion in water below 160° F., whereby the amount of water that is imbibed incident to soaking is controlled to a predetermined point such that the level of imbibed moisture taken with the level which is subsequently imbibed incident to steaming will not give rise to a significant moisture increase and aggravate starch rupture; by controlling the level of total water uptake to below 17½% in any given immersion and subsequent steaming, and preferably maintaining this total water uptake at 12% and below, the amount of solids loss incurred is minimal. Collaterally, although the duration of the overall cooking process will be prolonged, the uniformity of cook will be substantial and the loss in solids will be minimized, i.e., 10% or less. The invention in its broadest aspects contemplates employing at least two steam cooking operations succeeded by cold water immersions; since the parboiled rice will preferably be soaked for a substantial period prior to the initial steaming which will not result in modification of the grain structure, the first soak after steaming will be the first such immersion to require but a brief period of time. The invention may be modified by increasing the number of steaming steps and correspondingly decreasing the period of each such steaming step, but in all such process modifications, the immersion will be of a short duration such as will give rise to a very limited increase in the moisture content of the rice introduced to each respective succeeding steaming step. Thus, the rice can be repeatedly steamed and the aforesaid period of 15 to 25 minutes can be correspondingly reduced to a period, say as low as five minutes; in such operations the immersion period will be correspondingly reduced.

Following the underlying precepts of the present invention, it will be understood, therefore, calls for periodic low temperature water immersion and water agitation sufficient to increase the moisture content of the rice incrementally, with each succeeding steaming step being of such duration as to be commensurate with the ability of the parboiled rice grains to uniformly distribute the moisture of an increment picked up during immersion throughout the grain, this sequence being repeated for a sufficient number of times to achieve at least about 60% moisture in a fully cooked product. As a result, the cooked rice product will be characterized by the substantial absence of white centers of uncooked rice while having the companion property of a substantial freedom from split ends and a minimal loss of rice solids through sloughing during cooking. It is believed that this property is achieved through the advantageous combination of such steam cooking steps and the toughening produced by steaming the rough rice during parboiling.

While the present invention has been described with particular reference to specific examples, it is not to be limited thereby, but reference is to be had to the appended claims for a definition of its scope.

What is claimed is:

1. Process for preparing a quick-cooking rice which comprises immersing parboiled rice grains in water at a temperature below about 160° F. for a period of time sufficient to increase the moisture content of said grains to 15–50%; enveloping the hydrated rice in an atmosphere of steam until the rice is elevated to a temperature of 180°–212° F., and the imbibed water of hydration is substantially uniformly distributed throughout the rice; thereafter reimmersing the rice in water at a temperature less than 160° F. to imbibe an additional moisture increment; admitting the rice to at least one subsequent steaming step wherein the rice is reenveloped in an atmosphere of steam and thereby reelevated to a temperature of 180°–212° F., and whereby said additional moisture increment is substantially uniformly distributed throughout the rice; thereafter admitting the rice to at least one subsequent immersion step wherein the rice is immersed in water at a temperature less than 160° F. whereby an additional moisture increment is imbibed; said rice being uniformly cooked, swollen and hydrated to a moisture content of at least about 60% by repeating said immersion and steaming steps in sequence until said moisture level is reached; and thereafter dehydrating the cooked rice under drying conditions whereat the rice is reduced to a stable moisture content.

2. Process according to claim 1 wherein the rice is immersed in water at a temperature between about 50° and about 160° F.

3. Process according to claim 2 wherein the rice increases in moisture content by less than 7.5% during each such steaming step and the rice increases in moisture content during each immersion and agitation by less than 10% after the first steaming step.

4. Process according to claim 3 wherein the rice increases in moisture content during each steaming step by about 5%.

5. Process according to claim 2 wherein said rice is hydrated to a moisture content between about 65–75% by said steaming and immersion steps.

6. Process according to claim 5 wherein the temperature of the rice is reduced to less than 90° F. during each immersion step following the first.

7. Process according to claim 6 wherein the level of total water uptake during each immersion and succeeding steaming step is less than 12½% after the initial steaming step.

8. Process of claim 7 wherein the moisture content of the parboiled rice is increased to 30–50% prior to the first steaming step.

9. Process of claim 8 wherein the bed temperature of the soaked rice is elevated during each steaming step to a temperature of 212° F. and each steaming step proceeds for a period of at least 5 minutes.

10. Process according to claim 9 wherein the rice is subjected to each steaming step for a period of 13–25 minutes.

11. Process according to claim 10 wherein the rice following each steaming step, is immersed and agitated in water at a temperature below about 90° F. for a period of less than 2 minutes to firm the rice and cause it to imbibe additional moisture and separate the grains from one another.

12. Process according to claim 11 wherein the temperature, humidity and velocity of the drying medium admitted to the drying zone during the initial dehydration phase maintain a drying rate whereby the cooked rice undergoes a volume reduction of less than 40% as it is dehydrated to an intermediate moisture level of 50%.

13. Process of claim 12 wherein the cooked rice is dried to its 50% moisture level using recirculating drying air at a temperature between 220°–320° F., the humidity and the temperature of the drying air being maintained below that point at which particle temperature during drying exceeds the gelatinization temperature of rice starch.

14. Process according to claim 13 wherein the cooked rice is finally dehydrated to a terminal stable moisture of about 7–14%.

15. Process according to claim 3 wherein the rice increases in moisture content during each immersion step by about 7.5%.

16. Process of claim 12 wherein the cooked rice is dried to its 50% moisture level using recirculating drying air at a temperature between 180°–290° F., the humidity and the temperature of the drying air being maintained below that point at which particle temperature during drying exceeds the gelatinization temperature of rice starch.

17. Process according to claim 16 wherein the cooked rice is finally dehydrated to a terminal stable moisture of about 7–14%.

References Cited

UNITED STATES PATENTS

| | | | |
|---|---|---|---|
| 2,438,939 | 4/1948 | Ozai-Durrani | 99—80 |
| 2,720,460 | 10/1955 | Flynn et al. | 99—80 |
| 2,903,360 | 9/1959 | Seltzer | 99—80 |
| 3,086,867 | 4/1963 | Miller | 99—80 |
| 3,189,461 | 6/1965 | Ozai-Durrani | 99—80 |
| 3,189,462 | 6/1965 | Autrey et al. | 99—80 |

RAYMOND N. JONES, *Primary Examiner.*